Jan. 13, 1970    P. C. NETZEL    3,489,847
INSULATING SUPPORT FOR SPACED-APART CABLES
Filed Oct. 20, 1967
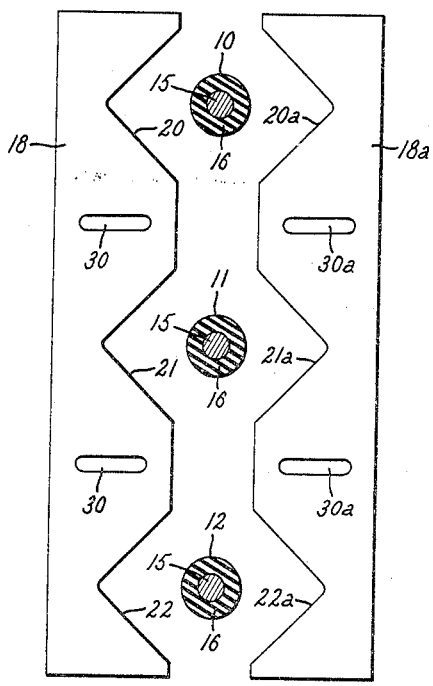
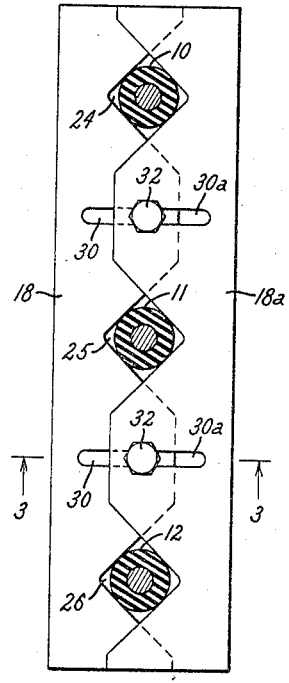
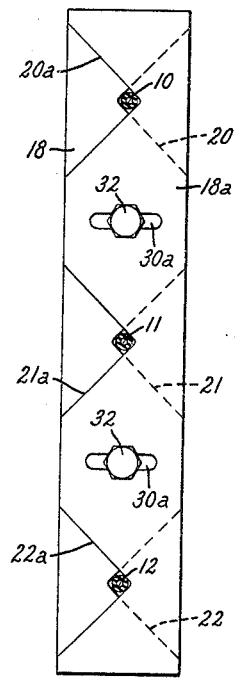
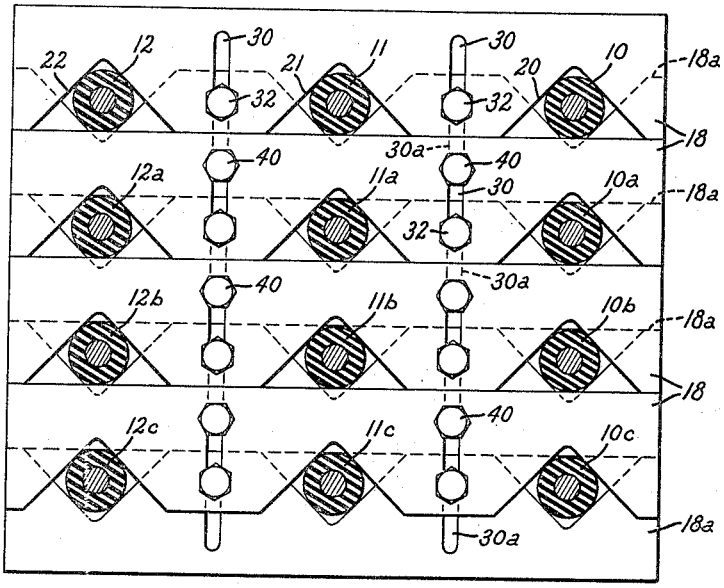
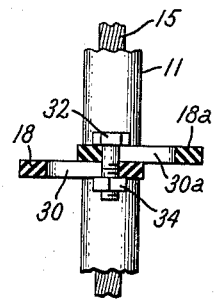
INVENTOR:
PHILIP C. NETZEL
BY William Freedman
ATTORNEY United States Patent Office 3,489,847
Patented Jan. 13, 1970

3,489,847
INSULATING SUPPORT FOR SPACED-APART
CABLES
Philip C. Netzel, Milmont Park, Pa., assignor to General
Electric Company, a corporation of New York
Filed Oct. 20, 1967, Ser. No. 676,874
Int. Cl. H01b 17/14
U.S. Cl. 174—146                                    1 Claim

ABSTRACT OF THE DISCLOSURE

An insulating support for three spaced-apart electric cables. Comprises two flat insulating plates, each having three V-shaped notches in a single edge. The plates are mounted in juxtaposed overlapping relationship with the notches in one plate confronting the notches in the other to form three diamond-shaped openings for respectively receiving the cables. The overlapping portions of the plates are clamped together at a desired position of adjustment to provide the desired size of diamond-shaped openings.

---

This invention relates to an insulating support for a plurality of spaced-apart electric cables and, more particularly, relates to a support that is readily adjustable to receive cables of different sizes.

Certain electrical apparatus comprises closely-spaced cables that carry high currents. Magnetic fields developed about these cables tend to move the cables back and forth, and such motion can impose severe shock loadings on the terminals of the cables. For preventing damage from this cable motion, various types of supports have been provided.

These supports have often been complicated and expensive and usually are not suited to accommodate cables of different sizes.

An object of my invention is to provide a simple and inexpensive cable support that can be easily adjusted to receive cables of different sizes and can clamp each of the cables with substantially equal force regardless of the cables' size, assuming that the cables supported at any one time are of equal size.

Another object is to provide a cable supporting arrangement of the above type that lends itself to clamping together a large number of cables, e.g., the cables of a polyphase system where multiple cables are used for carrying the current in each phase.

In carrying out the invention in one form, I provide two flat plates of insulating material, each having three spaced-apart V-shaped notches in a single edge of the plate. The plates are mounted in juxtaposed overlapping relationship with the notches in one plate confronting the notches in the other to form three diamond-shaped openings for respectively receiving the cables. The overlapping portion of at least one plate contains elongated slots located in the region between the diamond-shaped openings, and these slots permits the size of the diamond-shaped openings to be adjusted by varying the overlap between the plates. Fastening means extend through the slots and clamp the plates in a predetermined position of adjustment where the cables are firmly gripped by the walls of the V-shaped notches. The plates are mounted for movement in straight line paths relative to each other when the fastening means are in non-clamping relationship, thus permitting equal changes in the sizes of the diamond-shaped openings when the plates are moved to vary said overlap.

For a better understanding of the invention, reference may be had to the following description taken in conjunction with the accompanying drawing, wherein:

FIG. 1 is an exploded view showing a cable support embodying one form of the invention. The parts of the support are shown disassembled.

FIG. 2 is a view similar to that of FIG. 1 except showing the parts in assembled relationship.

FIG. 3 is a sectional view along the line 3—3 of FIG. 2.

FIG. 4 is a view similar to that of FIG. 2 except showing the parts adjusted to receive cables of a smaller diameter than in FIG. 2.

FIG. 5 is a side elevational view showing a cable supporting arrangement comprising a plurality of the supports of FIGS. 1–4.

Referring now to FIG. 1, there are shown three cables 10, 11, and 12 which respectively constitute the phase conductors of a three-phase A.C. system. Each cable comprises an elongated conductor 15 surrounded by an insulating sheath 16.

For supporting the cables in substantially fixed relationship to each other, I provide a cable support comprising a pair of flat plates 18 and 18a of a suitable insulating material, such as glass-fibre-reinforced polyester. The plates 18 and 18a are preferably of an identical form, and the same reference numerals differing only in the suffix "a" will therefore be used to designate corresponding parts.

Each plate includes three V-shaped notches in a single one of its edges. These notches are designated 20, 21, and 22 in one plate and 20a, 21a, and 22a in the other plate. When the support is assembled, as shown in FIG. 2, the two plates are mounted in juxtaposed overlapping relationship. The notches 20, 21, and 22 in one plate are disposed in confronting relation to notches 20a, 21a, and 22a in the other plate, so that three diamond-shaped openings 24, 25 and 26 are formed between the two plates.

By varying the amount of overlap between the two plates, the size of the diamond-shaped openings 24–26 can be varied to accommodate cables of different sizes. The overlapping portions of the two plates contain elongated slots 30 and 30a that partially register as the size of the diamond-shaped openings is varied by varying the overlap between the two plates. Through each pair of registering slots 30, 30a, a fastening device in the form of a bolt 32 extends. Referring to FIG. 3 when the plates 18, 18a are moved into a desired position of adjustment, nuts 34 on the bolts are tightened to clamp the plates together and hold them in the desired position of adjustment.

The diamond-shape of each cable-receiving opening enables cables of different sizes to be firmly clamped at four spaced points about the cable periphery by the walls of the opening. For example, in FIG. 2 it can be seen that each of the relatively large diameter cables 10, 11, and 12 is clamped at four points around its periphery by the walls of the surrounding opening. This same relationship is present in FIG. 4, where cables of smaller diameter are clamped by the cable-supporting plates.

It is to be noted that the slots 30 and 30a are of substantially straight-line configuration, and this permits the plates 18 and 18a to be moved in straight line paths relative to each other so that relative movement of the plates varies the size of the three openings by equal amounts. Thus, substantially equal clamping pressure can be applied to all three cables irrespective of the cable size, assuming that the three cables supported at any one time are of equal size. The straight line slot 30, 30a and the fastening means 32, when loosened, may be thought of as means for mounting the plates for straight line movement relative to each other.

Locating each fastening means 32 between adjacent cables is desirable since it secures the overlapping portions of the plates 18, 18a firmly together in the region between the two cables and effectively provides a support of double thickness in this region. This reinforces the support and provides added strength to resist relative lateral motion of the cables under the influence of high magnetic forces.

Providing the V-shaped notches in both plates 18 and 18a, instead of only a single one, is desirable since this allows for a greater overlap between the plates, thus strengthening this critical overlap region and also permitting longer slots to be used to allow for greater adjustability. Also the use of two V-shaped notches provides for the above-described four point contact between the cable and the surrounding opening.

When each phase of the electric circuit comprises a plurality of parallel conductors, a plurality of the cable supports of FIGS. 1-4 can be stacked up to support all the cables. This is illustrated on FIG. 5, where one phase includes cables 10, 10a, 10b and 10c; another includes cables 11, 11a, 11b, and 11c; and the remaining phase includes cables 12, 12a, 12b, and 12c.

Four cables supports corresponding to the cable supports of FIGS. 1-4 are stacked up to support these four sets of cables. One plate of each cable support is positioned adjacent the opposite plate of the adjacent cable support, and these adjacent plates are bolted together in overlapping relationship. This is preferably done by bolts 40 located in the same slots 30, 30a as the fastening means 32 which hold together the two plates of a given cable support. These bolts between adjacent cable supports serve to fix the individual parallel cables of a given phase against lateral motion with respect to each other.

What I claim as new and desire to secure by Letters Patent of the United States is:

1. A supporting arrangement for a plurality of sets of electric cables, each set including three cables, comprising a plurality of cable supports for supporting the three cables of the respective sets of cables, each of said supports comprising:
   (a) two flat plates of insulating material, each having three spaced-apart V-shaped notches in a single edge of the plate,
   (b) said plates being disposed in juxtaposed overlapping relationship, with the notches in one plate confronting the notches in the other plate to form three diamond-shaped openings for respectively receiving said cables,
   (c) the overlapping portion of at least one of said plates containing elongated slots located in the region between said diamond-shaped openings, said slots permitting the size of said diamond-shaped openings to be adjusted by varying the overlap between said plates,
   (d) fastening means extending through said slots and clamping said plates in a predetermined position of adjustment where the walls of said V-shaped notches are adapted to firmly grip said three cables,
   (e) said plates being mounted by said slots and fastening means for movement in straight line paths relative to each other when said fastening means are in non-clamping relationship thereby producing equal changes in the size of said diamond-shaped openings when said plates are moved to vary said overlap,
   means for mounting said cable supports in juxtaposed relationship with one plate of one support mounted in overlapping relationship to one plate of an adjacent support, and means fastening said overlapping plates of adjacent supports together.

References Cited

UNITED STATES PATENTS

| | | |
|---|---|---|
| 387,413 | 8/1888 | Griffin et al. |
| 1,123,333 | 1/1915 | Lucas _____ 256—52 |
| 2,134,350 | 10/1938 | Woolley. |

FOREIGN PATENTS

| | | |
|---|---|---|
| 6,746 | 2/1928 | Australia. |
| 768,339 | 2/1957 | Great Britain. |

LARAMIE E. ASKIN, Primary Examiner

U.S. Cl. X.R.

24—115; 248—68